(12) United States Patent
Del Fabro

(10) Patent No.: US 11,865,605 B2
(45) Date of Patent: Jan. 9, 2024

(54) APPARATUS AND METHOD FOR HANDLING BARS

(71) Applicant: M.E.P. Macchine Elettroniche Piegatrici S.P.A., Reana del Rojale (IT)

(72) Inventor: Giorgio Del Fabro, Udine (IT)

(73) Assignee: M.E.P. MACCHINE ELETTRONICHE PIEGATRICI S.P.A., Reana del Rojale (IT)

(*) Notice: Subject to any disclaimer, the term of this patent is extended or adjusted under 35 U.S.C. 154(b) by 317 days.

(21) Appl. No.: 17/292,874

(22) PCT Filed: Nov. 11, 2019

(86) PCT No.: PCT/IT2019/050239
§ 371 (c)(1),
(2) Date: May 11, 2021

(87) PCT Pub. No.: WO2020/100174
PCT Pub. Date: May 22, 2020

(65) Prior Publication Data
US 2021/0402458 A1    Dec. 30, 2021

(30) Foreign Application Priority Data

Nov. 12, 2018 (IT) .......................... 102018000010247

(51) Int. Cl.
*B21D 43/00* (2006.01)
*B21D 43/20* (2006.01)
(Continued)

(52) U.S. Cl.
CPC .......... *B21D 43/006* (2013.01); *B21D 43/20* (2013.01); *B65G 1/0442* (2013.01); *B65G 21/12* (2013.01);
(Continued)

(58) Field of Classification Search
CPC .... B21D 43/006; B21D 43/20; B65G 1/0442; B65G 21/12; B65G 41/003; B65G 47/08;
(Continued)

(56) References Cited

U.S. PATENT DOCUMENTS 11,130,640 B2 * 9/2021 Del Fabro ............. B21D 43/006
11,458,524 B2 * 10/2022 Del Fabro ............. B65G 47/907

FOREIGN PATENT DOCUMENTS

| AU | 3889768 A | 12/1969 |
| DE | 3117464 A1 | 3/1982 |

(Continued)

OTHER PUBLICATIONS

Int'l Search Report and Written Opinion dated Feb. 20, 2020 in Int'l Application No. PCT/IT2019/050239.

*Primary Examiner* — Lynn E Schwenning
(74) *Attorney, Agent, or Firm* — Panitch Schwarze Belisario & Nadel LLP

(57) ABSTRACT

Apparatus for handling bars including a support plane configured to support a plurality of bars having an oblong development, and handling devices configured to remove a bar from a removal zone of the support plane and to deliver it to a delivery zone. Movement devices are associated with the support plane which are configured to distribute the bars on the support plane and to move them toward the removal zone.

12 Claims, 9 Drawing Sheets

(51) Int. Cl.
  *B65G 1/04*    (2006.01)
  *B65G 21/12*   (2006.01)
  *B65G 41/00*   (2006.01)
  *B65G 47/08*   (2006.01)
  *B65G 47/14*   (2006.01)
  *B65G 47/34*   (2006.01)

(52) U.S. Cl.
  CPC ........... *B65G 41/003* (2013.01); *B65G 47/08* (2013.01); *B65G 47/1492* (2013.01); *B65G 47/34* (2013.01); *B65G 2201/0276* (2013.01)

(58) Field of Classification Search
  CPC ................ B65G 47/1492; B65G 47/34; B65G 2201/0276; B65G 47/519; B65G 47/06
  See application file for complete search history.

(56) References Cited

FOREIGN PATENT DOCUMENTS

| | | | |
|---|---|---|---|
| EP | 2908965 | A1 | 8/2015 |
| NL | 2004370 | C2 | 9/2011 |
| WO | 2017/216085 | A1 | 12/2017 |

\* cited by examiner

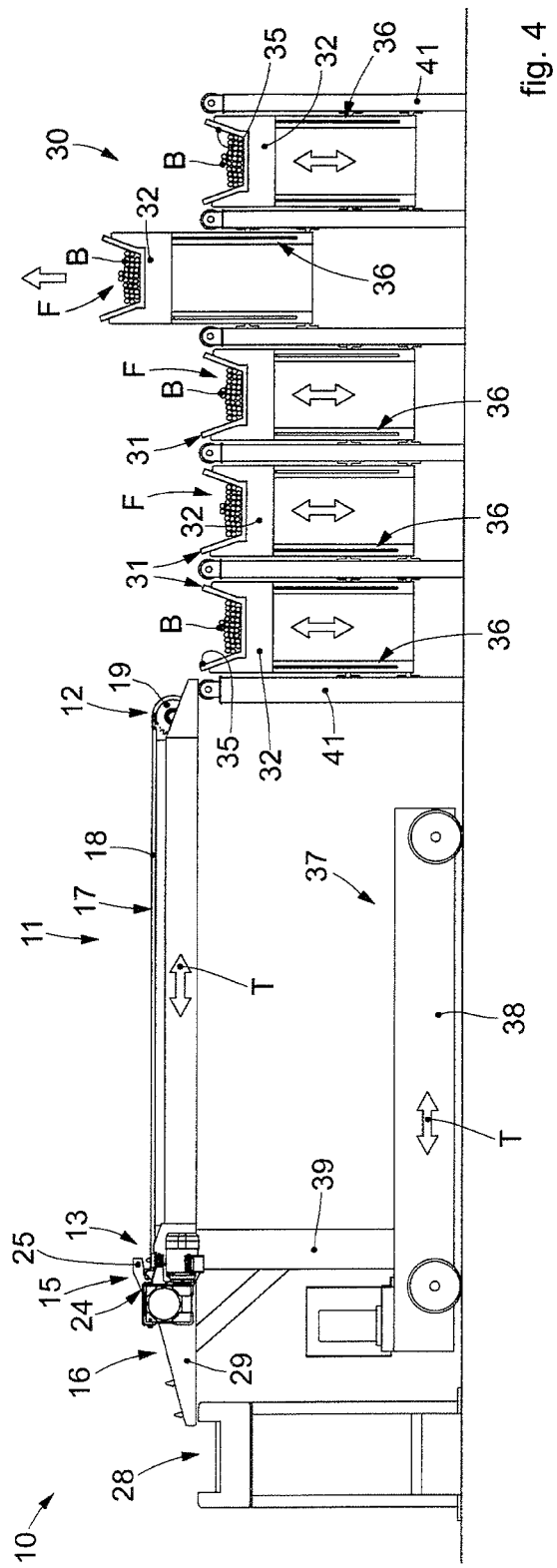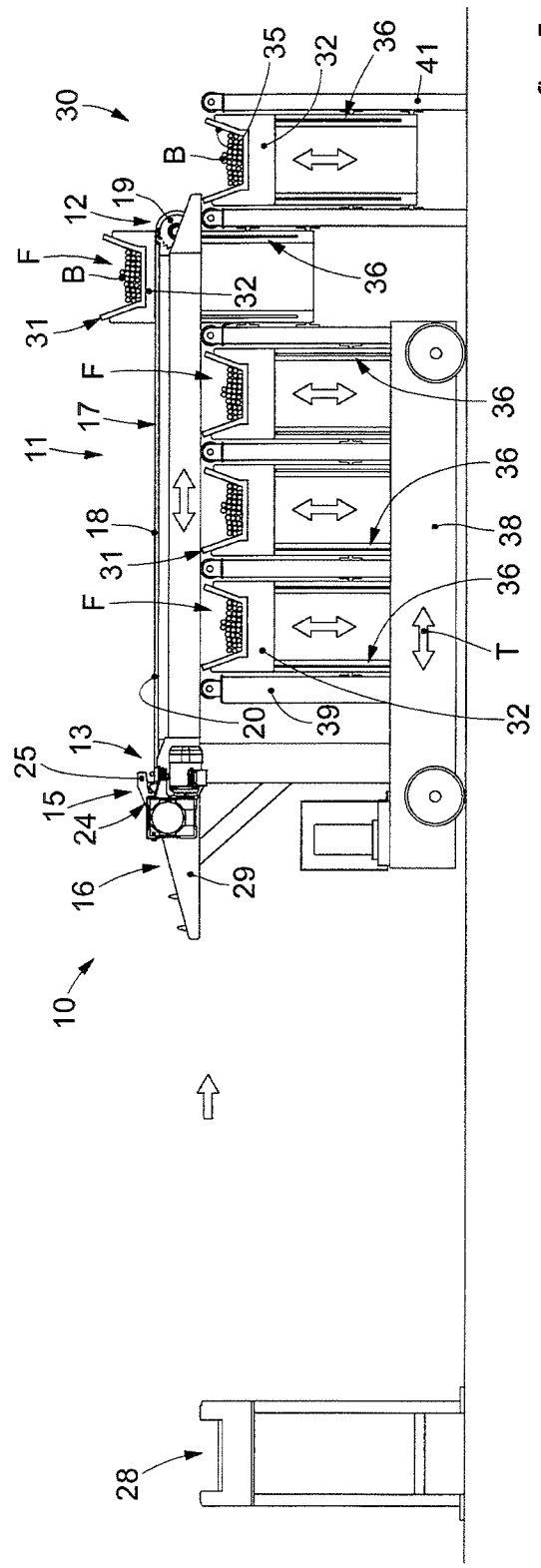

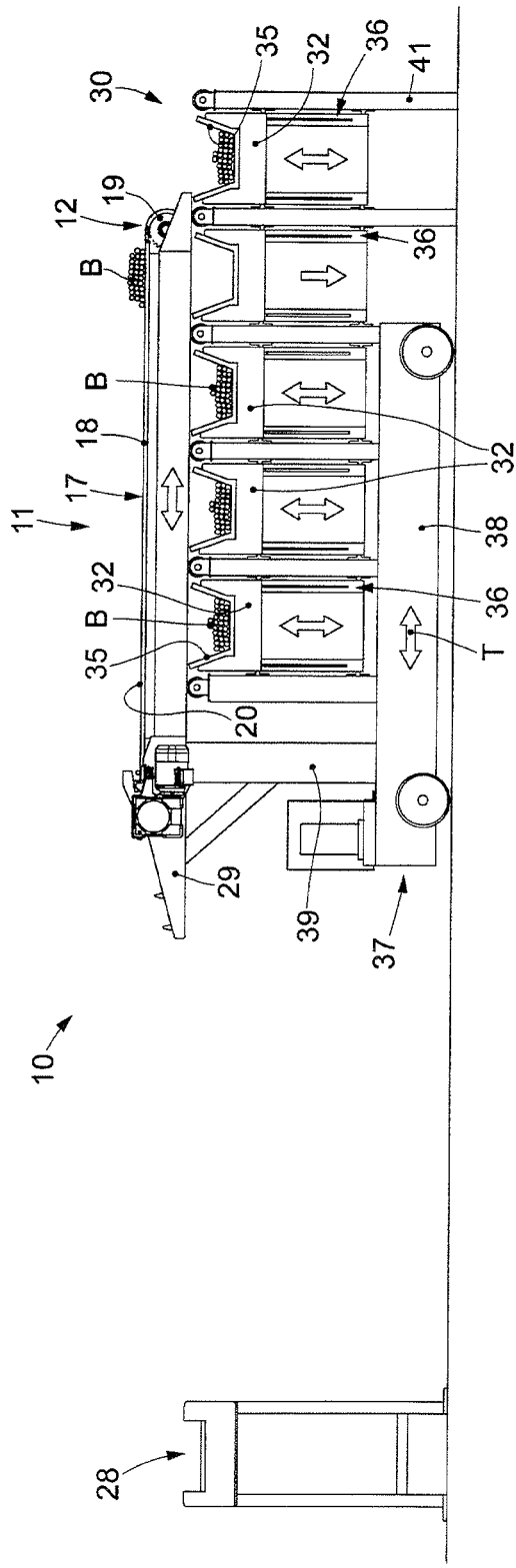
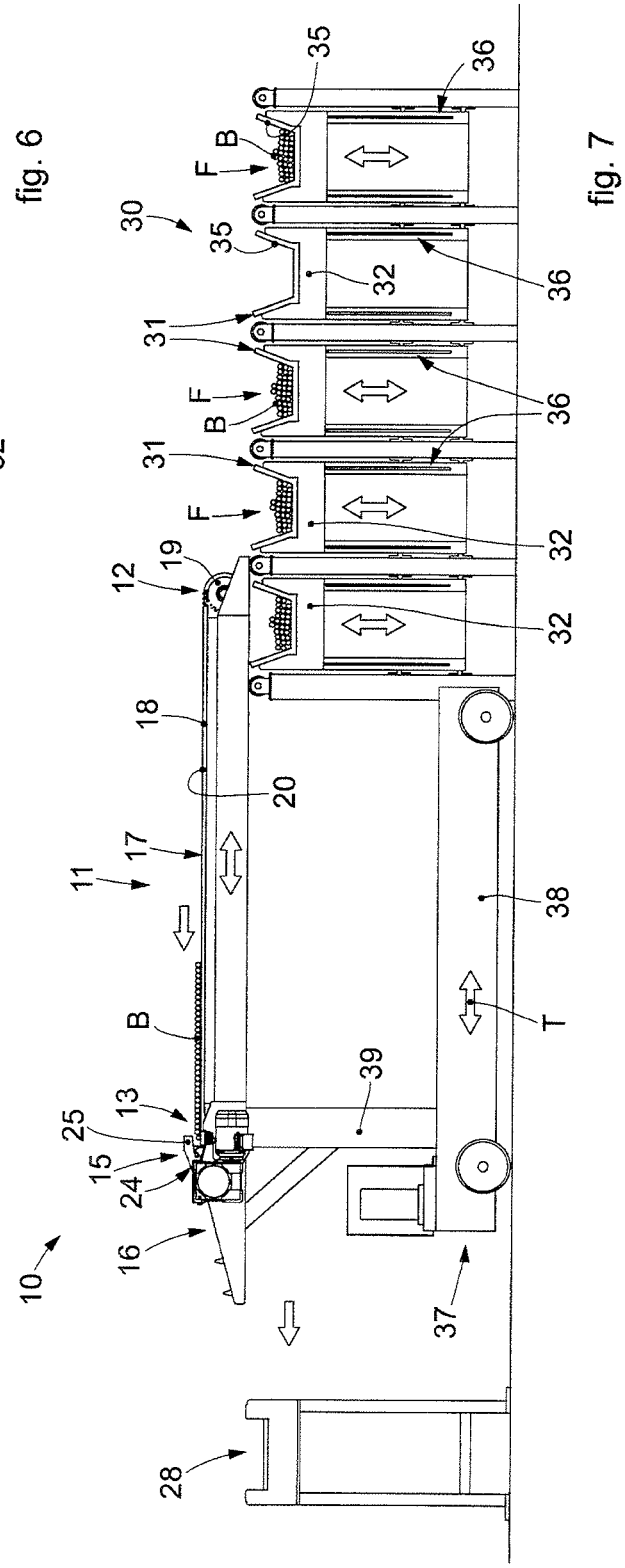

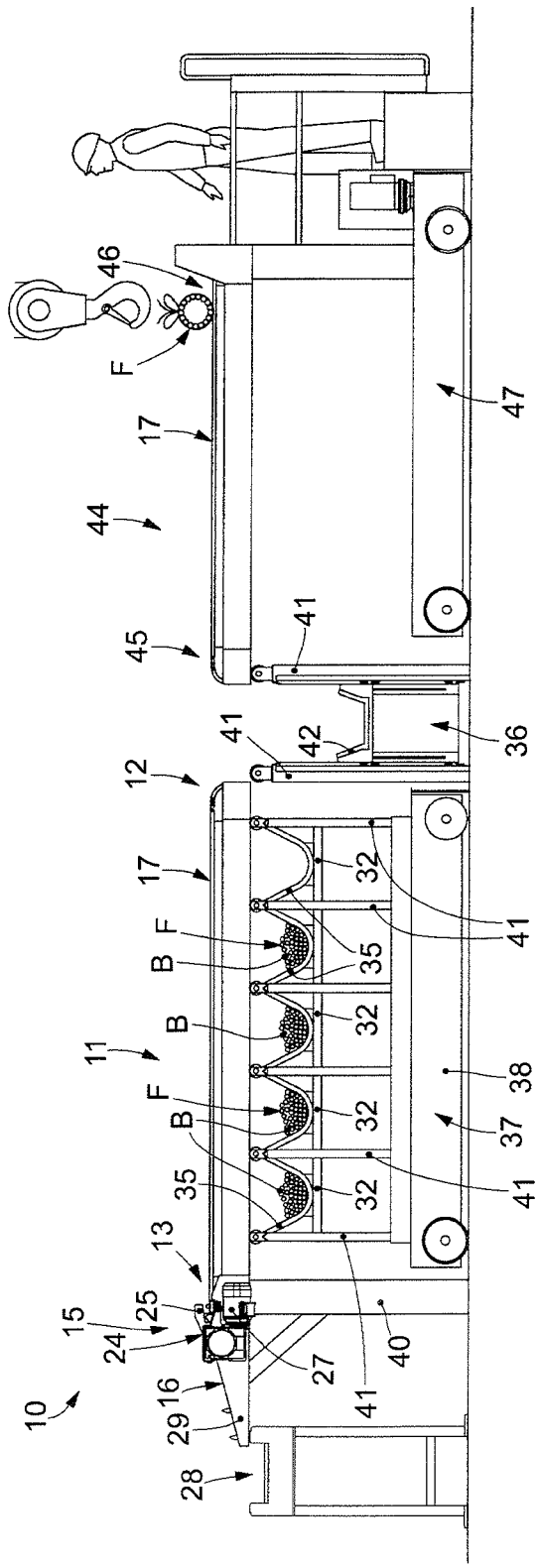
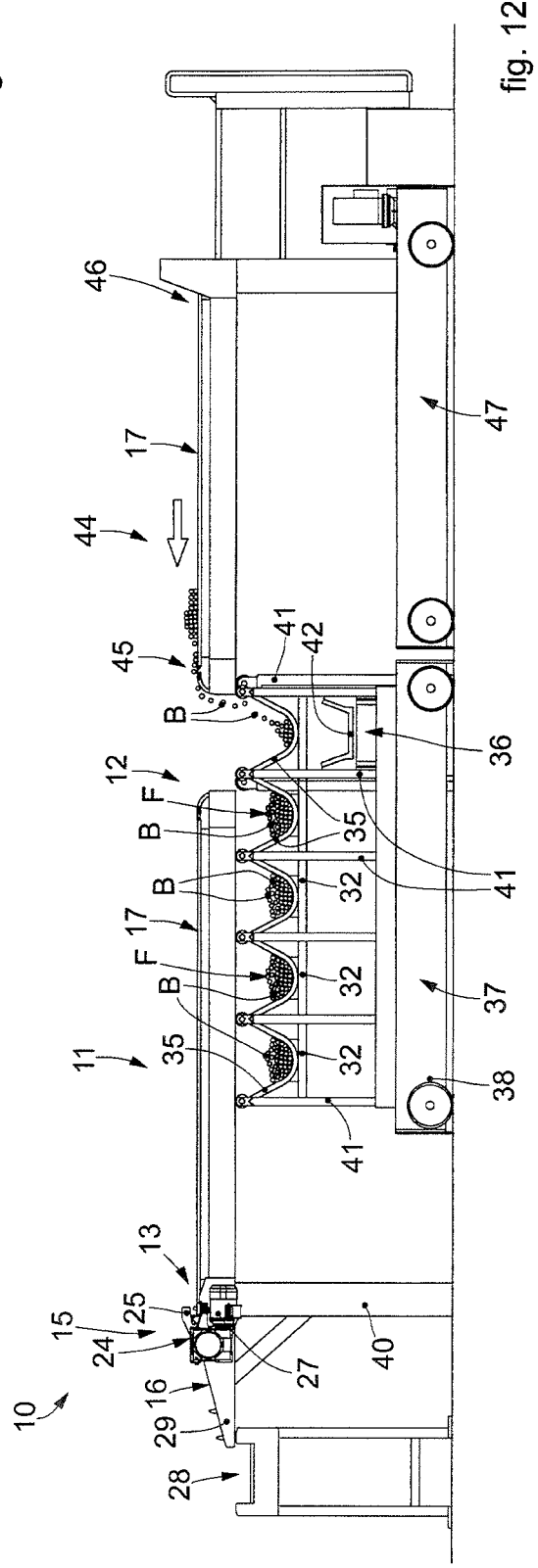

APPARATUS AND METHOD FOR HANDLING BARS

CROSS-REFERENCE TO RELATED APPLICATIONS

This application is a Section 371 of International Application No. PCT/IT2019/050239, filed Nov. 11, 2019, which was published in the English language on May 22, 2020, under International Publication No. WO 2020/100174 A1, which claims priority under 35 U.S.C. § 119(b) to Italian Application No. 102018000010247, filed Nov. 12, 2018, the disclosures of each of which are incorporated herein by reference.

FIELD OF THE INVENTION

The present invention concerns an apparatus and method for handling bars.

In particular, the present invention can be used to remove a specific bundle from a store of bundles of bars and subsequently remove one or more bars at a time from this bundle and supply them to a delivery zone, such as one or more user machines located downstream.

With the term bars we generally mean products with an oblong shape such as rod, reinforcement rods, round pieces, square pieces, or suchlike, which have a circular, polygonal or flat shaped cross-section.

These bars can be made of metal, and can be used, for example, in the construction field.

BACKGROUND OF THE INVENTION

It is known to feed bars to user machines, such as bending, stirrup making, and welding machines, cutting plants, counting plants or other.

In particular, it is known to remove the bars by means of bridge cranes or suchlike from suitable stores and to supply them to a feed station that feeds them to an end user machine.

Depending on the final product to be obtained, the bars to be supplied to the user machine can also be of different types, for example of a different diameter, material, shape, surface working or other.

Normally, each type of bar is supplied in bundles, so that a first bundle can be formed by bars of a first type, a second bundle can be formed by bars of a second type, and so on.

On each occasion, each bundle of bars is removed with a bridge crane from the corresponding store in which it is located and delivered to the feed station. The feed station can be provided with a support plane on which the bundle is located. The support plane allows to spread out the bars for the subsequent removal and feeding to the user machine by means of a handling device associated with the support plane.

Once the production of a determinate range of products has ended, the remaining bars spread out on the support plane are recomposed again and bound to form a new bundle of residual bars. This new bundle is removed by the bridge crane and replaced in the store.

Another bundle of bars, for example of a different type, is removed with the bridge crane, is transferred onto the support plane and therefore the cycle starts again as previously.

The procedure for transferring the bars from the store to the support plane, and vice versa, therefore proves to be extremely complex since it requires the use of dedicated structures, the presence of operators to suitably guide and position, on each occasion, the movement of the bars from the store to the work plane.

Furthermore, this operation of substituting the type of bars, can also prove to be time consuming and also determine possible machine downtimes of the user machines located downstream of the supply apparatus considered.

One purpose of the present invention is therefore to provide an apparatus for handling bars that simplifies and reduces the timings for substituting the type of bars to be supplied to the end user machine.

It is also a purpose of the present invention to provide a handling apparatus with which bars of different types can be suitably stored in correspondence with the feed station, to then be disposed directly on the feed station, without therefore requiring the use of bridge cranes, removal devices, or other means able to remove, on each occasion and according to needs, bars of different types from one or more stores for storing the bars.

Another purpose of the present invention is to provide an apparatus for supplying bars in which a store containing a plurality of bars of a different type can be directly associated at least with the feed station of the apparatus.

It is therefore a purpose of the present invention to provide an apparatus for supplying bars which allows to supply the bars to user machines located downstream avoiding, for example, machine downtimes to allow for bar format change operations.

Another purpose of the present invention is to perfect an effective and automated method for supplying bars, in particular metal bars of different types.

The Applicant has devised, tested and embodied the present invention to overcome the shortcomings of the state of the art and to obtain these and other purposes and advantages.

SUMMARY OF THE INVENTION

The present invention is set forth and characterized in the independent claims, while the dependent claims describe other characteristics of the invention or variants to the main inventive idea.

In accordance with the above purposes, an apparatus for handling bars, according to the present invention, comprises a support plane configured to support a plurality of bars having an oblong development, and handling devices configured to remove a bar from a removal zone of the support plane and to deliver it to a delivery zone.

Movement devices are associated with the support plane and configured to distribute the bars on the support plane and to move them toward the removal zone.

In accordance with one aspect of the present invention, the handling apparatus comprises a store provided with a plurality of containing units having an oblong development in a longitudinal direction, disposed adjacent with respect to each other in a transverse direction and each of which is configured to house a respective bundle of bars.

The bundles of bars can differ from each other by type of material, sizes, length or suchlike.

In accordance with another aspect of the present invention, the handling apparatus comprises at least one movement unit configured to move at least one bundle of bars contained in one of the containing units in a direction incident to the support plane, between a first condition located below the support plane and a second condition located above the support plane.

In accordance with another aspect of the present invention, at least one of either the support plane or the store is selectively translatable in the transverse direction as above, in order to dispose the support plane and the store at least in a first position in which they at least partly overlap each other and a second position in which they are at least partly adjacent to each other in the transverse direction.

By suitably coordinating the movement of one of either the support plane or the store with the movement of one or the other of the containing units of the bundles of bars it is possible to perform the operations of loading and unloading the bars of each of the bundles of bars.

Embodiments of the present invention also concern a method for handling bars which provides to:
  position a plurality of bars having an oblong development on a support plane,
  distribute the bars on the support plane,
  move the bars toward a removal zone of the support plane and
  remove, with handling devices, a bar from the removal zone of the support plane and deliver it to a delivery zone.

In accordance with one aspect of the invention, the method also provides to move at least one bundle of bars contained in one of the containing units with at least one movement unit, in a direction incident to the support plane, between a first condition located below the support plane and a second condition located above the support plane.

Moreover, at least one of either the support plane or the store is selectively translated in the transverse direction, in order to dispose the support plane and the store at least in a first position in which they at least partly overlap each other and a second position in which they are at least partly adjacent to each other in the transverse direction.

BRIEF DESCRIPTION OF THE DRAWINGS

These and other characteristics of the present invention will become apparent from the following description of some embodiments, given as a non-restrictive example with reference to the attached drawings wherein:

FIGS. 4-9 show an operative functioning sequence of the apparatus of FIG. 2;

FIGS. 11-16 show an operative functioning sequence of the apparatus of FIG. 10;

To facilitate comprehension, the same reference numbers have been used, where possible, to identify identical common elements in the drawings. It is understood that elements and characteristics of one embodiment can conveniently be incorporated into other embodiments without further clarifications.

DETAILED DESCRIPTION OF SOME EMBODIMENTS

Figure 1:
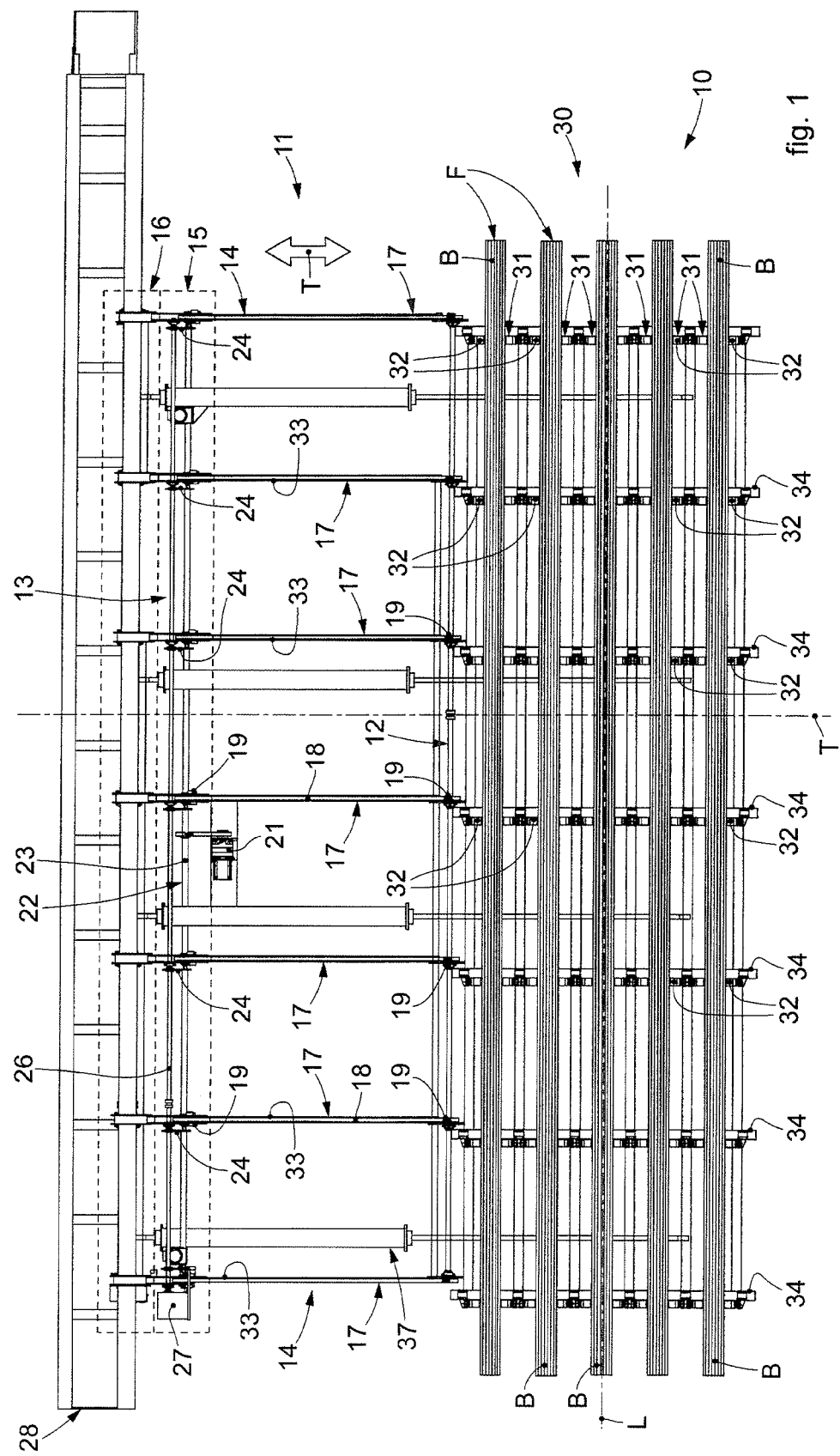
FIG. 1 is a plan view of an apparatus for handling bars according to the present invention.

We will now refer in detail to the various embodiments of the invention, of which one or more examples are shown in the attached drawings. Each example is supplied by way of illustration of the invention and shall not be understood as a limitation thereof. For example, the characteristics shown or described insomuch as they are part of one embodiment can be adopted on, or in association with, other embodiments to produce another embodiment. It is understood that the present invention shall include all such modifications and variants.

Embodiments of the present invention concern an apparatus for handling bars B, indicated as a whole with reference number 10.

The bars B have a mainly oblong development and after handling by the handling apparatus 10 according to the present invention they can be subjected to workings such as bending, curving, stirrup making, or welding.

The handling apparatus 10, according to the present invention, comprises at least one support plane 11 configured to support a plurality of bars B, for example a bundle F of the bars B.

The support plane 11 can be positioned horizontal to prevent the bars B from moving by gravity in an unwanted manner.

The support plane 11 is provided with a first longitudinal edge 12, with a second longitudinal edge 13 opposite the first longitudinal edge 12 and with two lateral edges 14, interposed between the first longitudinal edge 12 and the second longitudinal edge 13.

The first longitudinal edge 12 and the second longitudinal edge 13 have a length substantially equal to, or greater than, the length of the bars B to be processed.

The bars B, in fact, are loaded onto the support plane 11, according to the modes described hereafter, substantially parallel to the first longitudinal edge 12 and to the second longitudinal edge 13.

The support plane 11 can be provided with a removal zone 15 in correspondence with which the bars B are removed, according to the modes described hereafter, to be delivered in a delivery zone 16 located downstream of the support plane 11.

In accordance with a possible solution, the removal zone 15 is positioned in correspondence with the second longitudinal edge 13 of the support plane 11.

According to one aspect of the present invention, movement devices 17 are associated with the support plane 11 and configured to distribute the bars B uniformly on the support plane 11 and to move them toward the removal zone 15.

The movement devices 17 are configured to move the bars B parallel to each other.

The movement devices 17 are positioned on the support plane 11 distanced from each other along the extension in length of the support plane 11 and each of them acts on a portion of the bars B to determine the movement of each of the bars B.

In particular, the bars B, in a bundle, can be unloaded onto the support plane 11 and, thanks to the presence of the movement devices 17, they can be uniformly distributed on the latter preventing them from overlapping, or reciprocally entangling which would compromise the subsequent removal of the bar B.

According to a possible solution, an interspace 33 is defined between two adjacent movement devices 17 in which the bars B are not supported.

In accordance with a possible solution, each movement device 17 has an oblong development in a transverse direction T, which is located transversely, advantageously orthogonally, to the oblong development of the first longitudinal edge 12 of the support plane 11.

In particular, it can be provided that each movement device 17 has a first end located in correspondence with the first longitudinal edge 12 and a second end located in correspondence with the second longitudinal edge 13.

In this way, the movement devices 17 are able to receive all the bars B disposed on the support plane 11.

In accordance with possible embodiments of the present invention, each movement device 17 comprises a transmission member 18 selectively movable in a closed ring around return members 19.

The transmission member 18 defines, between the return members 19, return segments 20, at least one of which lies on the support plane 11 and is disposed in the transverse direction T.

In particular, it can be provided that the return segment 20 of the return members 19 has at least one support surface, facing toward the outside and lying on the support plane 11. Each return segment 20 of the transmission members 18 is located in contact with a portion of the bars B determining the distribution and movement of the bars B on the support plane 11.

In accordance with a possible solution, the return segments 20 can themselves define the support plane 11 in correspondence with which the bars B are supported.

According to possible embodiments of the present invention, the transmission member 18 can be chosen in a group comprising at least one of either a chain, a belt, or a cable.

In accordance with the embodiment shown in FIG. 1, the transmission members 18 comprise a chain, for example of the roller type. The choice of a roller chain, thanks to the irregularity of the support surface defined by the links that make up the chain, allows to generate vibrations on the bars B such as to induce a homogeneous distribution thereof on the support plane 11.

Figure 8:
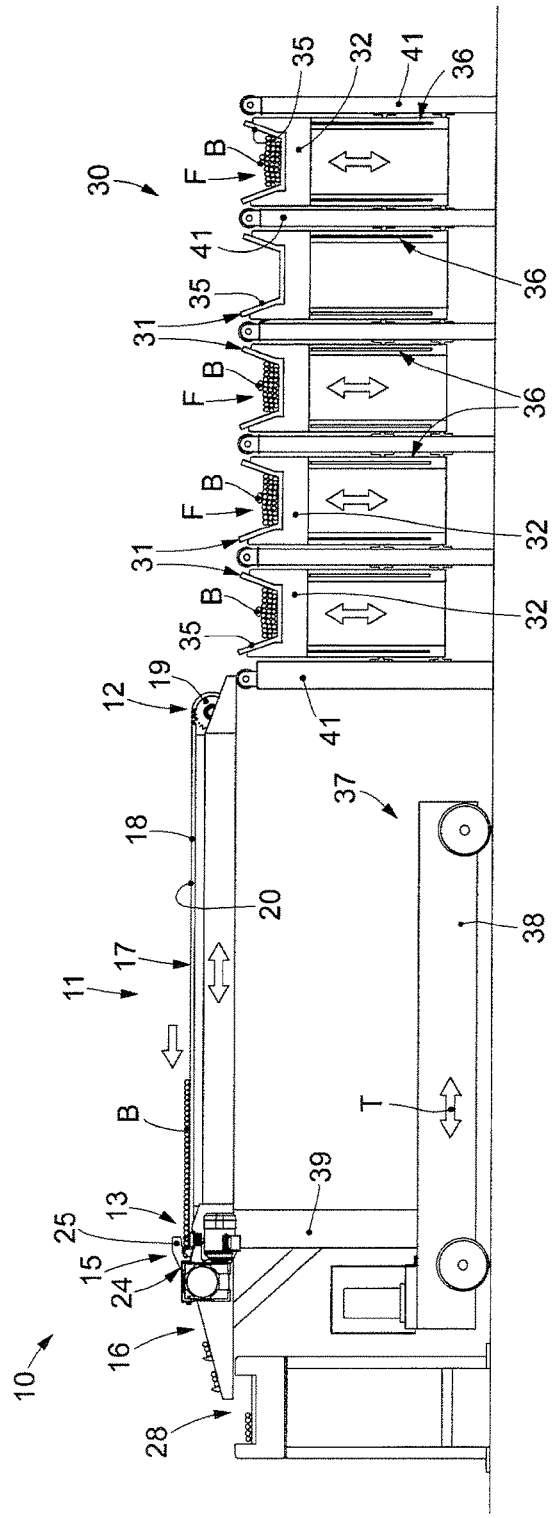
Figure 9:
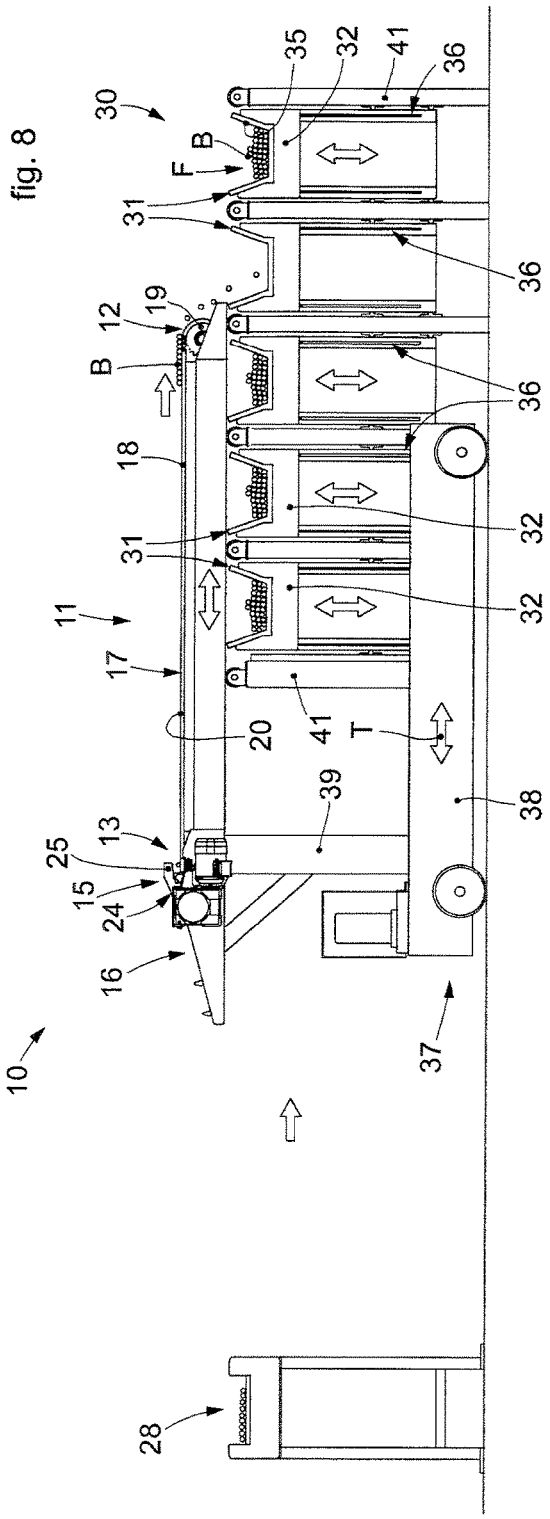

The roller chain, in fact, during its movement in the transverse direction T, induces an oscillation of the bars B, which are released from each other and are distributed, one next to the other, on the support plane 11, as shown in FIGS. 7-9.

The return members 19 can comprise at least one of either wheels, pulleys, crown wheels, suitable to allow the winding of the transmission member 18 around them.

In accordance with possible solutions, the return members 19 comprise crown wheels, not visible in the drawings, on which the links of the roller chains engage. This solution ensures that there is no reciprocal sliding between the return members 19 and the transmission members 18.

In accordance with a possible solution, shown in FIG. 1, the movement devices 17 are connected to a motor member 21 configured to drive the movement devices 17.

In accordance with the solution shown in FIGS. 1, 3-7 the motor member 21 can be connected to synchronization devices 22 configured to synchronize the movement of all the movement devices 17, thus obtaining a uniform and parallel translation of the bars B in the transverse direction T.

According to the solution shown in FIGS. 1, 3-7, the synchronization devices 22 comprise a transmission shaft 23 connected kinematically with the motor member 21 and with the movement devices 17. By driving the motor member 21, the transmission shaft 23 is made to rotate about its axis, determining the simultaneous drive, synchronized, of all the movement devices 17.

In the embodiment shown in FIG. 1, the transmission shaft 23 is positioned in correspondence with the second longitudinal edge 13 of the support plane 11.

The transmission shaft 23 can be located substantially on the same plane as the support plane 11, thus being able to substantially contain the overall bulk of the handling apparatus 10.

In accordance with another aspect of the invention, the handling apparatus 10 comprises handling devices 24 configured to remove, on each occasion, a bar B from the removal zone 15 of the support plane 11 and to deliver it to the delivery zone 16.

Figure 2:
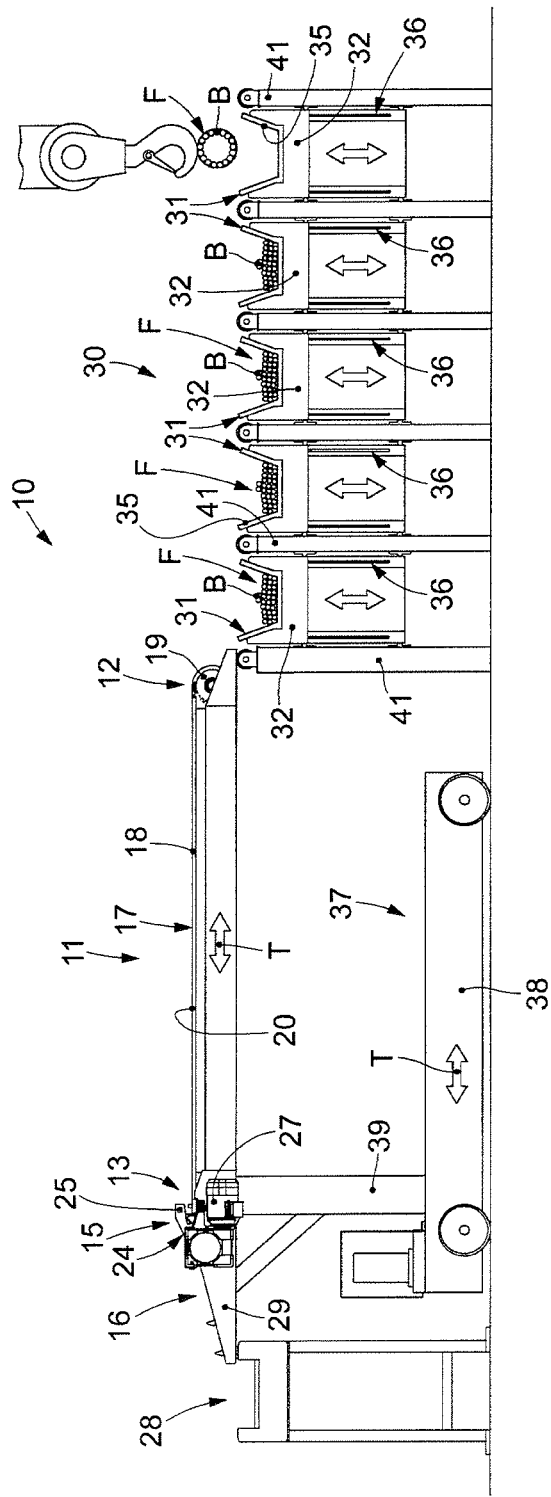
FIG. 2 is a lateral view of the apparatus for handling bars of FIG. 1.

According to the solution shown in FIGS. 1 and 2, the handling devices 24 are reciprocally distanced along the longitudinal development of the support plane 11.

In this way, the handling devices 24 each act on a predefined longitudinal portion of the bar B supporting the latter along its entire length, and preventing oscillations of the bar B due to its own weight.

In accordance with one aspect of the present invention, the handling devices 24 comprise a plurality of transfer arms 25 provided with holding elements, for example magnetic, configured to magnetically hold one of the bars B during its transfer between the removal zone 15 and the delivery zone 16.

The magnetic holding elements can comprise for example permanent magnets. It is not excluded, however, that in possible solutions the magnetic holding elements comprise electromagnets selectively activatable with the induction of a magnetic field.

In accordance with another aspect of the invention, the transfer arms 25 are alternately mobile between the removal zone 15 and the delivery zone 16, and vice versa.

According to a possible solution of the invention (FIG. 2), each transfer arm 25 is provided with a first end around which the transfer arm 25 is made to alternately rotate, and a second end with which the respective holding element is associated.

The transfer arms 25 can be installed on a common rotation shaft 26 which is selectively rotatable to simultaneously take the transfer arms 25 from the removal zone 15 to the delivery zone 16, or vice versa.

In particular, the transfer arms 25 are keyed onto the rotation shaft 26 with their first end.

In accordance with a possible solution, the rotation shaft 26 is connected to an actuation member 27 configured to make the rotation shaft 26 rotate about its own axis and, with it, the transfer arms 25.

The rotation shaft 26 allows to synchronize the movement of all of the transfer arms 25 moving the bar B in a uniform manner and without causing deformations.

In accordance with the embodiments shown in FIGS. 1-7, the rotation shaft 26 is installed adjacent in parallel to the oblong development of the second longitudinal edge 13 and extends substantially for the entire length thereof.

The particular conformation of the transfer arms 25, as well as their actuation, ensures the reception and hold by the holding elements of one product at a time. Moreover, the bars B, fed to the transfer arms 25 by means of the movement devices 17, are always kept aligned and the bars B are prevented from overlapping during the thrust exerted by the movement devices 17.

According to possible solutions, detection devices can be installed in the removal zone 15, which are not visible in the drawings, configured to detect the presence of one of the bars B in contact with the holding elements.

A control and command unit, not shown in the drawings, can be electrically connected at least to the detection devices and to the actuation member 27 and is configured to command the activation of the handling devices 24, in order to take the bar B from the removal zone 15 to the delivery zone 16, only when all the detection devices detect the presence of the bar B in contact with the respective holding element. This prevents, during the transfer of the bar B from the removal zone 15 to the delivery zone 16 with the handling devices 24, there being any loss of grip, or any segment of the bar B not being gripped.

The delivery zone 16 is laterally adjacent to the removal zone 15 of the support plane 11.

In accordance with a possible solution of the present invention, the delivery zone 16 defines a delivery plane inclined downward with respect to the support plane 11. In this way, when the bar B is delivered to the delivery zone 16, it is unloaded, by gravity, to a user machine 28 downstream, in the case shown a transfer machine.

In accordance with variant embodiments, not shown, the delivery zone 16 can be defined by the user machine 28, or by a part thereof.

In accordance with a possible solution of the invention (FIG. 2), the delivery zone 16 can comprise a plurality of support brackets 29 distanced from each other along the longitudinal development of the first longitudinal edge 12.

Each support bracket 29 can be configured as an inclined plane and be provided with a support surface suitable to support a portion of the bar B.

In accordance with possible embodiments of the present invention, the handling apparatus 10 comprises at least one control and command unit, not shown in the drawings and connected at least to the movement devices 17 and to the handling devices 24 and configured to synchronize the reciprocal movement thereof as a function of the time sequence of operations to be performed for the transfer of the bars B.

In accordance with another aspect of the present invention, the handling apparatus 10 comprises a store 30 provided with a plurality of containing units 31 having an oblong development in a longitudinal direction L, disposed adjacent with respect to each other in the transverse direction T and each of which is configured to house a respective bundle F of bars B.

In the case shown in the drawings, the number of containing units 31 is five, although a different number, for example greater or smaller, is not excluded.

The containing units 31 can be configured to each house a different type of bars B, for example of different sizes, different lengths, different types of material, or suchlike.

In accordance with one aspect of the present invention, the support plane 11, at least in one condition of use of the handling apparatus 10, is interposed between the store 30 and the user machine 28. In particular, it can be provided that the store 30, the support plane 11 and the user machine 28 are aligned with each other, in order, in the transverse direction T.

In accordance with possible embodiments of the present invention, each containing unit 31 has a concave conformation with a concavity open upward to receive the bundle F of bars B.

According to possible solutions, each containing unit 31 can comprise a plurality of support frames 32 adjacent and distanced with respect to each other in the longitudinal direction L in order to each support a portion of the respective bundle F of bars B.

In accordance with possible embodiments of the invention, between pairs of adjacent support frames 32 of a same containing unit 31 there can be a separation interspace 34.

Each support frame 32 can be provided with a housing seating 35 open upward, during use, and with which to support a portion of bundle F of bars B.

In accordance with another aspect of the present invention, the handling apparatus 10 comprises at least one movement unit 36 configured to move at least one bundle F of bars B contained in one of the containing units 31 in a direction incident to the support plane 11, between a first condition located below the support plane 11 and a second condition located above the support plane 11.

In particular, in the first condition the containing unit 31, with the respective bundle F, lies on a plane which is located below the support plane 11 and in a position that does not interfere with the latter.

In the second condition the containing unit 31, with the respective bundle F, lies on a plane which is located above the support plane 11, and in a position that does not interfere with the latter.

In accordance with a possible solution of the present invention (FIGS. 1-9), a respective movement unit 36 is associated with each containing unit 31, which is provided to move, in a distinct and separate manner, each containing unit 31 with respect to the others. In particular, it can be provided that each containing unit 31 integrates a respective movement unit 36.

In accordance with a possible solution, the at least one movement unit 36 can be configured to move the respective containing unit 31 in a vertical direction, or orthogonal to the transverse direction T and to the longitudinal direction L.

According to possible solutions of the invention, the movement unit 36 can comprise at least one of either a jack, a linear actuator, sliding guides, chain mechanisms, rack or grubscrew mechanisms, or suchlike.

According to possible solutions, the movement units 36 can be associated with the support frames 32.

In accordance with another aspect of the present invention, at least one of either the support plane 11 or the store 30 is selectively translatable in a direction parallel to the transverse direction T, to position the support plane 11 and the store 30 at least in a first position in which they at least partly overlap each other and a second position in which they are adjacent to each other in the transverse direction T.

In accordance with the embodiment shown in FIG. 2, the support plane 11 is selectively translatable in the transverse direction T to position itself in the first position in which it at least partly overlaps the store 30 (FIGS. 5, 6 and 9), and in the second position in which the support plane 11 and the store 30 are located adjacent with respect to each other. The store 30, in this solution, is installed in a fixed position.

In accordance with the variant embodiment of FIG. 3, the support plane 11 is installed in a fixed position while the store 30 is selectively translatable, in the transverse direction T, in order to position itself in the first position in which it is located below the support plane 11 and in the second position in which it is located adjacent, in the transverse direction T, to the support plane 11.

According to another variant of the present invention, not shown, both the support plane 11 and also the store 30 are selectively translatable in the transverse direction T in order to move to the first and second positions.

In accordance with another aspect of the present invention, at least one of either the support plane 11 or the store 30 is associated with a translation device 37 configured to translate at least one of either the support plane 11 or the store 30 in the transverse direction T.

The translation device 37 can comprise a support slider 38 on which the support plane 11 or the store 30 is installed.

The support slider 38 can be selectively translatable along translation guides located substantially parallel to the transverse direction T.

In accordance with possible solutions, the support slider 38 can comprise actuators, motors, or movement members provided to determine the movement of the support slider 38 in the transverse direction T.

In accordance with the embodiment of FIG. 2, the support plane 11 is installed on the support slider 38.

In accordance with this solution, the support plane 11 is supported on the support slider 38 keeping its first longitudinal edge 12 cantilevered.

In particular, it can be provided that the support plane 11 is installed on the support slider 38 by means of a support upright 39, which connects to the second longitudinal edge 13 of the support plane 11 itself, keeping the support plane 11 supported in correspondence with the second longitudinal edge 13 and leaving the first longitudinal edge 12 free, that is, cantilevered.

In this way, during the translation in the transverse direction T, the support plane 11 can overlap the store 30, preventing its parts from interfering with the movement.

In accordance with possible solutions, it can be provided that the support plane 11 has an unsupported, that is, cantilevered, length which is substantially equal to or greater than the width, determined in the transverse direction T, of the store 30.

According to possible solutions of the invention, the unsupported length extends from the first longitudinal edge 12 to the support upright 39 for the connection to the support slider 38.

Figure 3:
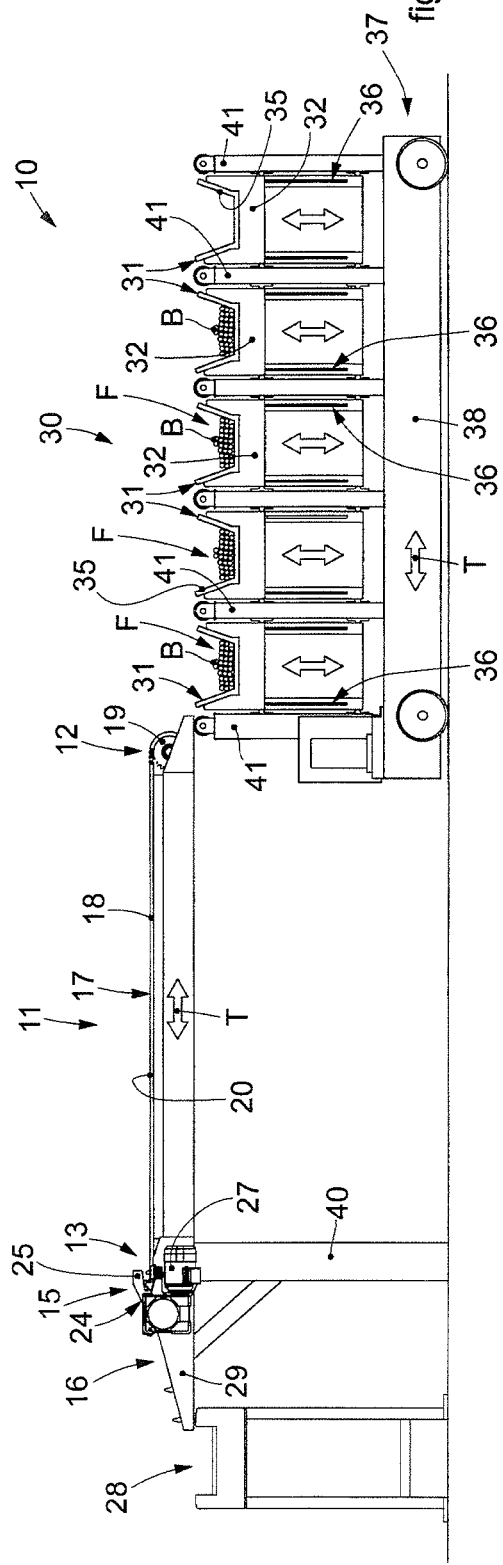
FIG. 3 is a variant embodiment of FIG. 2.

According to the variant embodiment of FIG. 3, the store 30 is installed on the support slider 38.

In accordance with this solution, the support plane 11 is supported, with respect to a resting plane, by means of a support structure 40.

The support structure 40 can be connected to the support plane 11 in correspondence with its second longitudinal edge 13, keeping its first longitudinal edge 12 free, that is, cantilevered.

In particular, it can be provided that the free length of the support plane 11, that is, unsupported cantilevered, has a length equal to or greater than the width of the store 30.

In accordance with possible solutions of the invention, at least in the first position described above, the movement devices 17 of the support plane 11 are positioned in the interspaces 34 present between adjacent pairs of support frames 32, preventing the support plane 11 and the store 30 from interfering with each other during movement.

According to one possible solution of the invention, the store 30 can be provided with a plurality of bearing elements 41 on which the support plane 11 is positioned, at least during movement, to discharge the stresses acting thereon, for example due to its own weight and the weight of the bars B it supports.

The bearing elements 41 are positioned resting on a second surface, opposite a first surface of the support plane 11. The bundle of bars B is positioned, during use, on the first surface.

The bearing elements 41 can be provided with rolling elements to facilitate the sliding of the support plane 11, resting thereon.

We will now describe, with reference to FIGS. 4-9, a possible operative functioning sequence of the apparatus of FIG. 2.

When it is necessary to feed a predefined type of bars B (FIG. 4), the containing unit 31 which houses the respective bundle F of bars B of the desired type is lifted, that is, it is moved from its first condition in which it lies below, that is, at a level below, the support plane 11, to its second condition in which it lies above the support plane 11. The support plane 11 is positioned adjacent to the store 30 on the side of the first longitudinal edge 12 of the support plane 11 itself.

Subsequently, at least one of either the support plane 11 or the store 30 are moved in the transverse direction T to dispose the support plane 11 at least partly overlapping with respect to the store 30. In the case shown in FIG. 5 the translation of the support plane 11 is commanded in the transverse direction T.

In this condition, the containing units 31 which have not been moved remain below the support plane 11, that is, in their first condition, while the containing unit 31 located in the second condition is located above a surface portion of the support plane 11.

Subsequently (FIG. 6), this latter containing unit 31 is moved from its second condition to its first condition, in which it is located below the support plane 11. During this passage and due to interference with the movement devices 17 of the support plane 11, the bundle F of bars B is held on the support plane 11 while the containing unit 31 which supported this bundle F is free to position itself below the support plane 11. In this condition, therefore, the bundle F of bars B is positioned on the support plane 11 and by means of the drive of the movement devices 17 it is possible to separate, that is, scatter the bars B on the support surface 11 for the subsequent removal by the handling devices 24.

The support plane 11 and the store 30 are moved to their second position in which they are adjacent to each other in the transverse direction T.

In particular, it is provided to translate in the transverse direction T at least one of either the support plane 11 or the store 30, in this case the support plane 11 (FIG. 7).

The support plane 11 can be moved, during its translation, with its second longitudinal edge 13 in correspondence with the user machine 28 in which the unloading, individual or possibly multiple, of the bars B occurs, as shown in FIG. 8.

Once the removal of the bars B from the support plane 11 and by means of the handling devices 24 is terminated, at least one of either the support plane 11 or the store 30, in the case shown the support plane 11, is translated in the transverse direction T (FIG. 9). The first longitudinal edge 12 of the support plane 11 is taken in correspondence with one of the containing units 31, for example the same one from which the bundle F of bars B was removed, and the unloading of the remaining residual bars B onto the support plane 11 is performed.

Also in this condition the support plane 11 at least partly overlaps the store 30 to allow in this way the unloading of the bars B by gravity inside the containing unit 31.

In accordance with possible embodiments, shown in FIGS. 10-16, the handling apparatus 10 comprises a single movement unit 36 adjacent, in at least one operative condition, to the support plane 11, and configured to move at least one bundle F of bars B of at least one of the containing units 31 which, on each occasion, is located in correspondence with the movement unit 36.

In accordance with a possible solution, the movement unit 36 can be installed in a fixed position with respect to the support plane 11, for example adjacent to the first longitudinal edge 12 thereof.

According to possible solutions (FIGS. 10-17), the store 30 is selectively translatable, with the translation device 37, in the transverse direction T, in order to dispose, on each occasion, at least one of the containing units 31 overlapping the movement unit 36. In this way, the bundle F of bars B contained in the containing unit 31, which overlaps the movement unit 36, is moved from the first condition to the second condition.

In accordance with this solution, it can be provided that the support plane 11 is fixed.

The movement unit 36, in this case, can be provided with a plurality of support cradles 42 disposed adjacent with respect to each other and each of which is configured to support a portion of bundle F.

In the condition in which the movement unit 36 overlaps the at least one containing unit 31 of the store 30, the support cradles 42 of the movement unit 36 can be interposed with the support frames 32 of the containing unit 31.

According to a possible implementation of the invention, the handling apparatus 10 comprises, in addition to the support plane 11, an auxiliary plane 44 adjacent to the first support plane 11 and configured to support a plurality of bars B.

The auxiliary plane 44 is provided with a first longitudinal edge 45, facing, during use, the first longitudinal edge 12 of the support plane 11, and with a second longitudinal edge 46 opposite the first longitudinal edge 45.

The first longitudinal edge 45 and the second longitudinal edge 46 have a length substantially equal to, or greater than, the length of the bars B to be processed. The bars B, in fact, are loaded onto the auxiliary plane 44 substantially parallel to the first longitudinal edge 45 and to the second longitudinal edge 46.

The auxiliary plane 44 is selectively translatable in the transverse direction T to at least partly interpose itself with the support plane 11 so that the support plane 11 and the auxiliary plane 44 define a single movement plane for the bars B.

For this purpose, the auxiliary plane 44 can be provided with a translation unit 47, substantially similar to the translation device 37, to move the auxiliary plane 44 in the transverse direction T.

The auxiliary plane 44 can be installed cantilevered on the translation unit 47, in a substantially similar manner to the installation of the support plane 11 on the translation device 37.

The auxiliary plane 44 can be provided with a plurality of movement devices 17 substantially similar to those of the support plane 11.

In the interposed condition of the support plane 11 and the auxiliary plane 44, the movement devices 17 of one are interposed, at least partly, with those of the other, to prevent the bars B from falling during the passage of the bars B from the auxiliary plane 44 to the support plane 11, or vice versa, and to prevent reciprocal interferences.

With reference to FIGS. 11-12, a possible operative sequence for loading the bars B into the store 30 is described.

When it is necessary to load a predefined type of bars B into a containing unit 31 of the store 30, an operator, with the aid of a bridge crane, positions a bundle F of bars B in correspondence with the second longitudinal edge 46 of the auxiliary plane 44, also providing to release it.

Subsequently, the movement devices 17 of the auxiliary plane 44 uniformly distribute the bars B on the latter in order to move them toward the first longitudinal edge 45.

In correspondence with the first longitudinal edge 45, the unloading of the bars B into the containing unit 31 is performed, which has been taken, for the operative sequence described, in correspondence with the first longitudinal edge 45.

In this case (FIGS. 11-12) to avoid interference between the containing units 31 and the movement unit 36, the latter is in a lower position, in particular in a position such that the support cradles 42 of the movement unit 36 are in a lower position with respect to the housing seatings 35 of the containing units 31.

Figure 10:
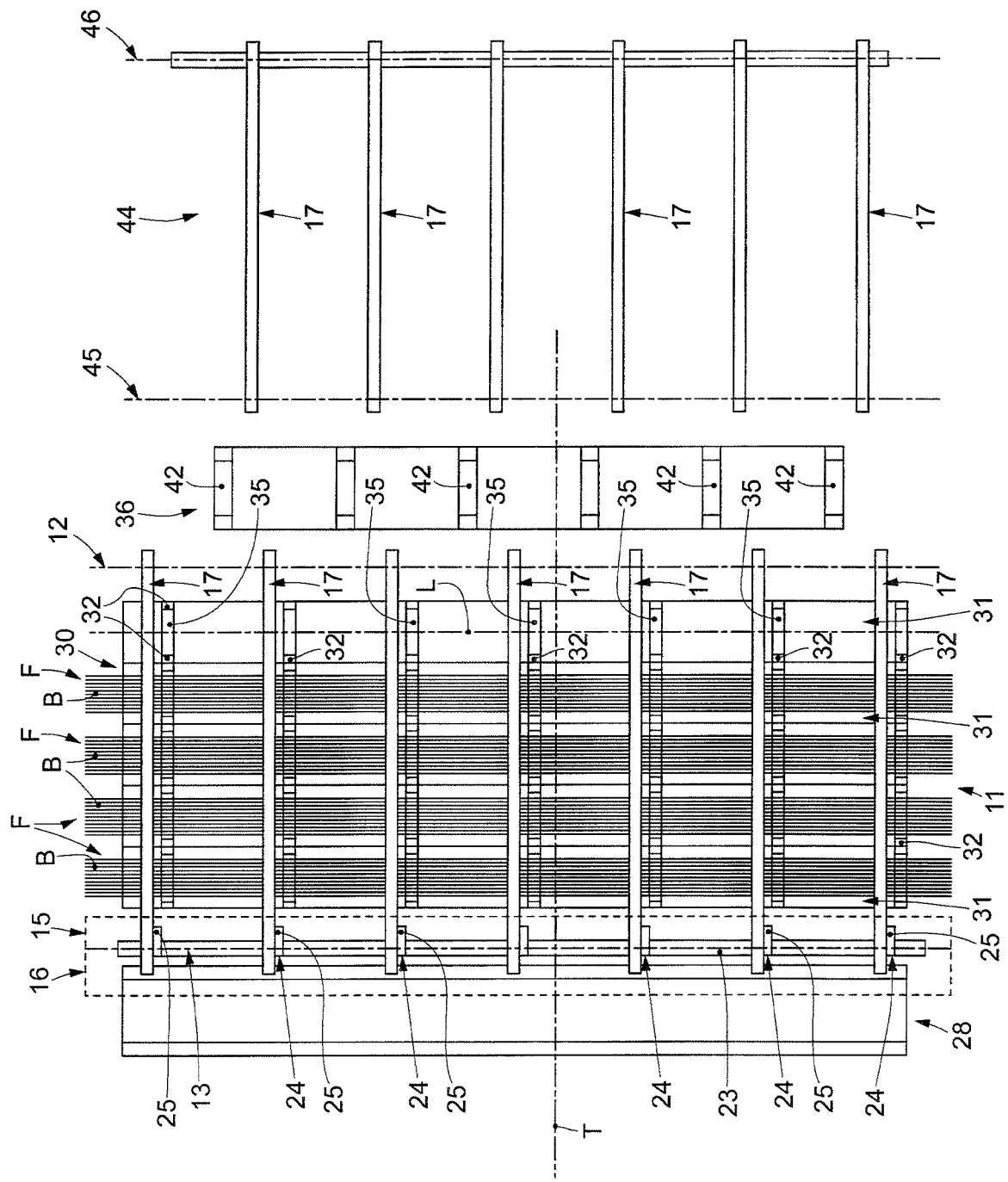
FIG. 10 is a plan view of a possible embodiment of an apparatus for handling bars according to the present invention.

With reference to FIGS. 13-16, a possible operative functioning sequence of the handling apparatus 10 of FIG. 10 is described.

Figure 13:
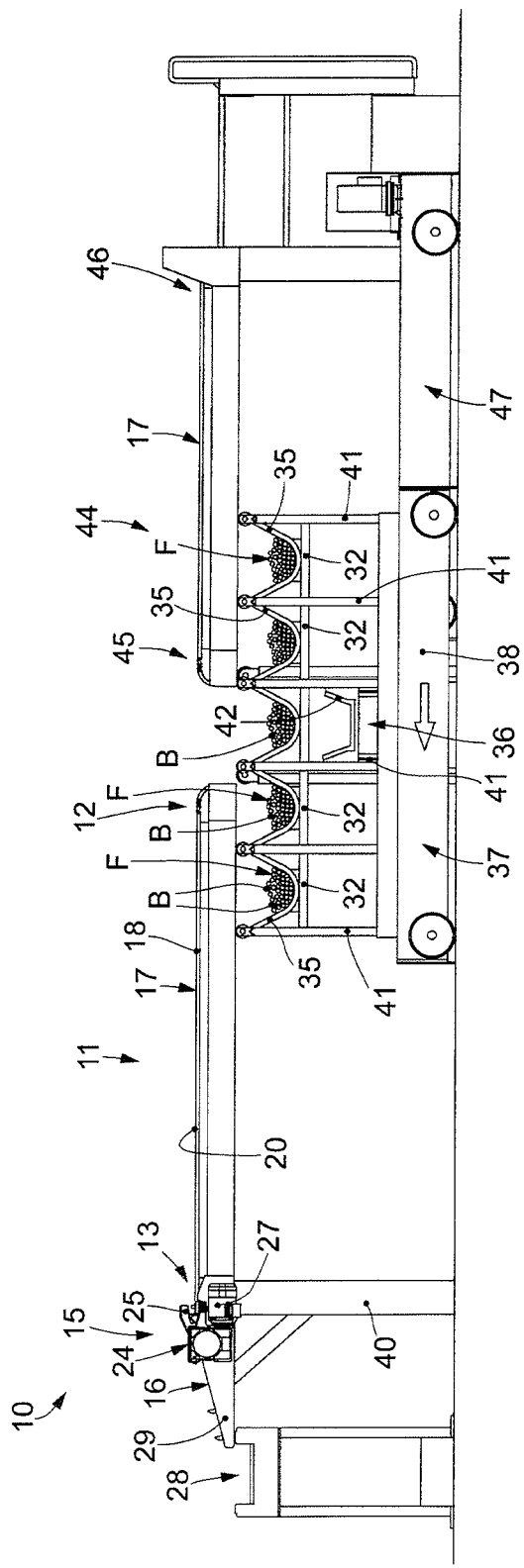

When it is necessary to feed a predefined type of bars B, the store 30 is translated so that the containing unit 31 which houses the respective bundle F of bars B of the desired type is disposed in correspondence with the movement unit 36 in order to overlap the latter which, to avoid interference, is in a lower position (FIG. 13).

Figure 14:
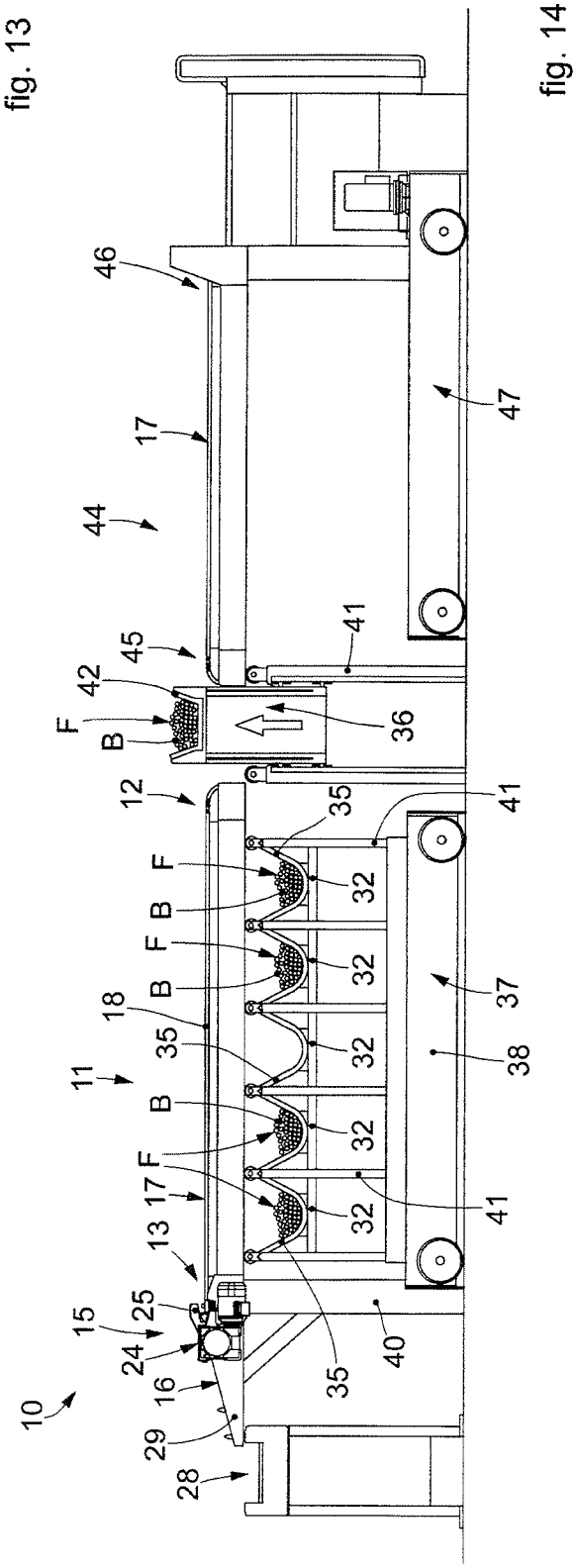
Figure 15:
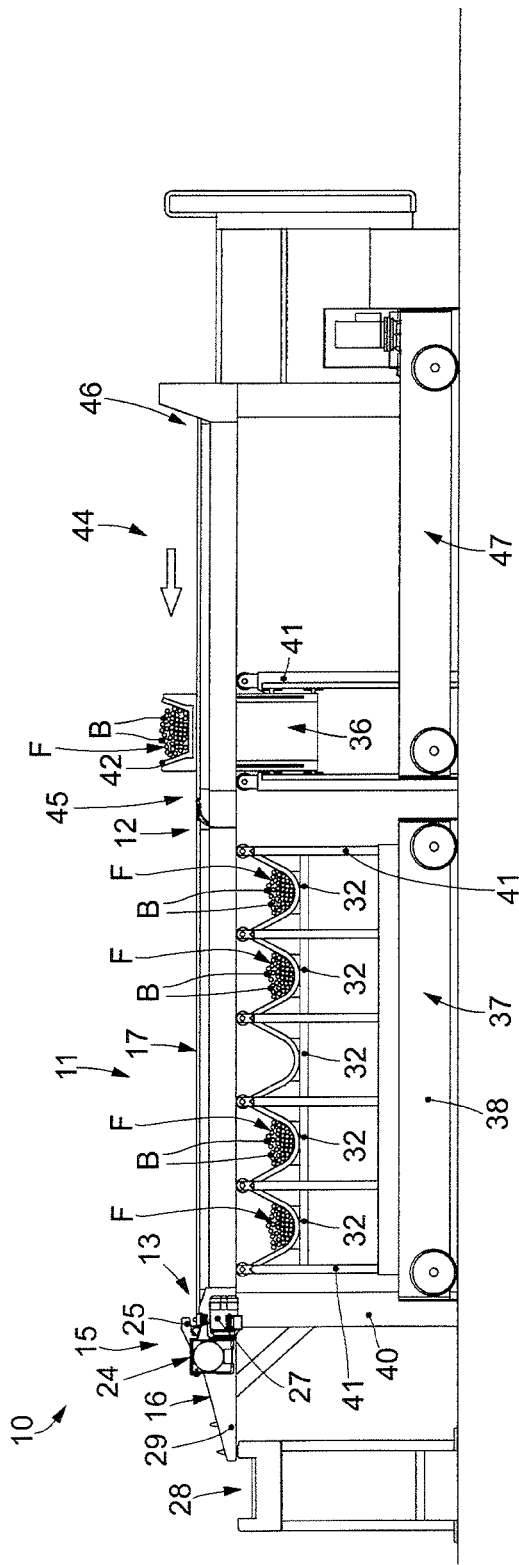

Subsequently, the movement unit 36 is lifted, that is, it is moved from a level below the support plane 11 and the auxiliary plane 44, to a level at which it lies above the support plane 11 and the auxiliary plane 44, determining, with this movement, the lifting of the bars B contained in the containing unit 31 (FIG. 14).

Figure 16:
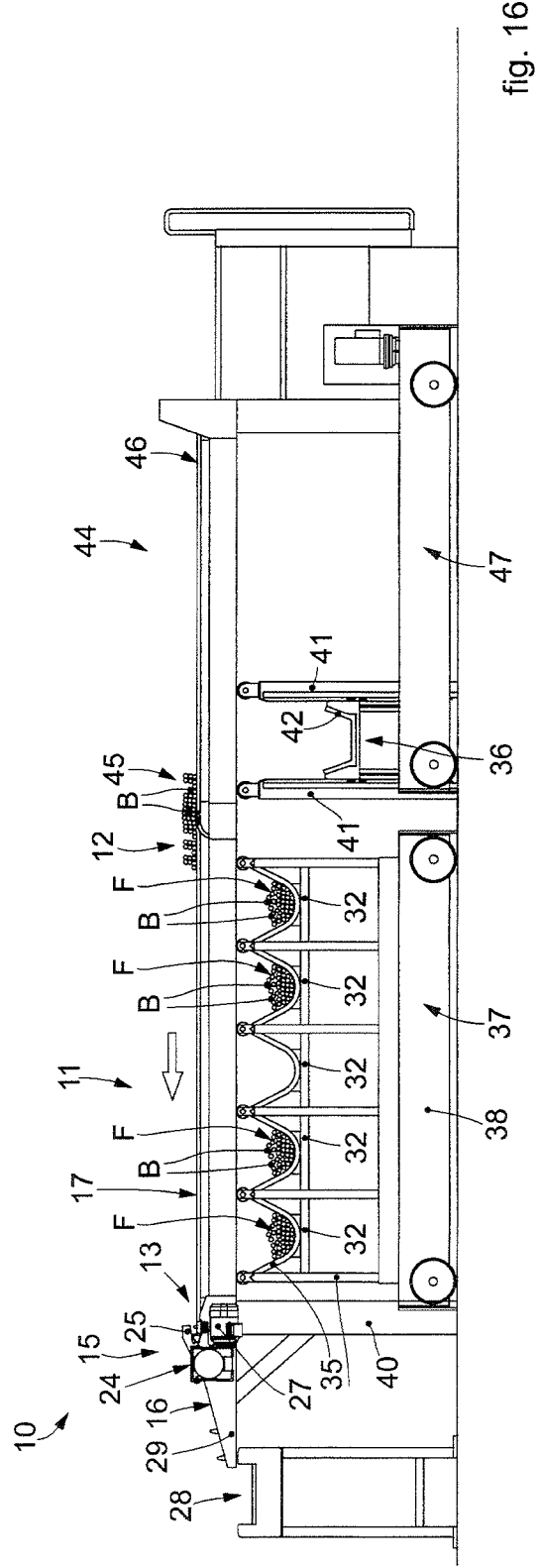

The auxiliary plane 44 is then translated in the transverse direction T in order to at least partly interpose itself with the support plane 11 (FIG. 15) while the movement unit 36 is moved from a level above the support plane 11 and the auxiliary plane 44, to a level at which it lies below the support plane 11 and the auxiliary plane 44, causing, due to interference with the movement devices 17 of the auxiliary plane 44, the bars B to be held on the latter (FIG. 16).

Subsequently, the bars B, moved on the support plane 11, are moved in a manner similar to what was described for the operative sequences of FIGS. 4-9.

According to a variant embodiment, not shown, the movement unit 36 can be selectively moved also in a direction parallel to the transverse direction T in order to allow the removal and/or delivery of the bars B from, or to, the support plane 11, which can in turn be selectively fixed or mobile. In this solution, the opportunity to also install the auxiliary plane 44 can be evaluated.

It is clear that modifications and/or additions of parts may be made to the handling apparatus 10 and to the method for handling bars B as described heretofore, without departing from the field and scope of the present invention.

It is also clear that, although the present invention has been described with reference to some specific examples, a person of skill in the art shall certainly be able to achieve many other equivalent forms of handling apparatus 10 and method for handling bars B, having the characteristics as set forth in the claims and hence all coming within the field of protection defined thereby.

The invention claimed is:

1. An apparatus for handling bars comprising:
   a support plane (11) configured to support a plurality of bars (B) having an oblong development,
   handling devices (24) configured to remove a bar (B) from a removal zone (15) of said support plane (11) and to deliver the bar (B) to a delivery zone (16),
   movement devices (17) being associated with said support plane (11) and configured to distribute said bars (B) on said support plane (11) and to move them toward said removal zone (15),
   a store (30) provided with a plurality of containing units (31) having an oblong development in a longitudinal direction (L), disposed adjacent with respect to each other in a transverse direction (T) and each of which is configured to house a respective bundle (F) of bars (B), and at least one movement unit (36) configured to move at least one bundle (F) of bars (B) contained in one of the containing units (31) in a direction incident to the support plane (11), between a first condition located below the support plane (11) and a second condition located above the support plane (11), wherein at least one of either the support plane (11) or the store (30) is selectively translatable in said transverse direction (T), in order to dispose the support plane (11) and the store (30) at least in a first position in which they at least partly overlap each other and a second position in which they are at least partly adjacent to each other in the transverse direction (T).

2. The apparatus as in claim 1, wherein at least one of either the support plane (11) or the store (30) is associated with a translation device (37) configured to translate at least one of either the support plane (11) or the store (30) in said transverse direction (T), and wherein said translation device (37) comprises a support slider (38) on which the support plane (11) or the store (30) is installed.

3. The apparatus as in claim 2, wherein said support plane (11) is installed on the support slider (38) by means of a support upright (39) configured to support the support plane (11), leaving cantilevered a first longitudinal edge (12) of the support plane (11), and wherein said support upright (39) connects to a second longitudinal edge (13) of the support plane (11) itself.

4. The apparatus as in claim 2, wherein said store (30) is installed on the support slider (38), and wherein said support plane (11) is supported, with respect to a resting plane, by means of a support structure (40), said support structure (40) being connected to the support plane (11) in correspondence with a second longitudinal edge (13), keeping its first longitudinal edge (12) cantilevered.

5. The apparatus as in claim 1 wherein said movement devices (17) are positioned on the support plane (11) distanced from each other along the extension in length of the support plane (11).

6. The apparatus as in claim 1, wherein each containing unit (31) comprises a plurality of support frames (32) adjacent and distanced with respect to each other in said longitudinal direction (L) to each support a portion of the respective bundle (F) of bars (B), and wherein between pairs of adjacent support frames (32) of a same containing unit (31) there is a separation interspace (34).

7. The apparatus as in claim 6, wherein at least in said first position, the movement devices (17) of the support plane (11) are positioned in said interspaces (34), preventing, during movement, said support plane (11) and the store (30) from interfering with each other.

8. The apparatus as in claim 1, wherein said store (30) is selectively translatable in said transverse direction (T), and wherein said apparatus comprises a single movement unit (36), in at least one operating condition, adjacent to said support plane (11), and configured to move at least one bundle (F) of bars (B) of at least one of said containing units (31) which is located on each occasion in correspondence with said movement unit (36).

9. The apparatus as in claim 1, wherein said at least one movement unit (36) is configured to move the containing units (31) in a vertical direction, or orthogonal to said transverse direction (T) and said longitudinal direction (L).

10. The apparatus as in claim 1, wherein it comprises an auxiliary plane (44) adjacent to said support plane (11) and configured to support a plurality of bars (B), and wherein said auxiliary plane (44) is selectively translatable in said transverse direction (T) to at least partly interpose itself between said support plane (11) so that said support plane (11) and said auxiliary plane (44) define a single movement plane for said bars (B).

11. A method for handling bars comprising the steps of:
positioning a plurality of bars (B) having an oblong development on a support plane (11),
distributing said bars (B) on said support plane (11),
moving said bars (B) toward a removal zone (15) of said support plane (11)
removing, with handling devices (24), a bar (B) from said removal zone (15) of said support plane (11) and delivering the bar (B) to a delivery zone (16),
positioning a plurality of bundles (F) of bars (B) in respective containing units (31) of a store (30), said containing units (31) being disposed adjacent to each other in a transverse direction (T),
moving at least one of the bundles (F) of bars (B) contained in one of said containing units (31) with at least one movement unit (36), in a direction incident to the support plane (11), between a first condition located below the support plane (11) and a second condition located above the support plane (11), and
selectively translating at least one of either the support plane (11) or the store (30) in said transverse direction (T), in order to dispose the support plane (11) and the store (30) at least in a first position in which they at least partly overlap each other and a second position in which they are at least partly adjacent to each other in the transverse direction (T).

12. The method as in claim 11, wherein when said support plane (11) and said store (30) are in their second position and at least one of said containing units (31) is taken into correspondence with the at least one movement unit (36), said movement unit (36) is moved from its first condition to its second condition, wherein, subsequently, said support plane (11) and said store (30) are disposed in said first position in which they at least partly overlap each other, and wherein said at least one movement unit (36) is taken from its second condition to its first condition to release the respective bundle (F) of bars (B) on said support plane (11).

* * * * *